(12) United States Patent  
Oishi et al.

(10) Patent No.: US 6,386,647 B2  
(45) Date of Patent: May 14, 2002

(54) HYDRAULIC BRAKE APPARATUS FOR A VEHICLE

(75) Inventors: Masaki Oishi; Michiharu Nishii, both of Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/820,676

(22) Filed: Mar. 30, 2001

(30) Foreign Application Priority Data

Mar. 30, 2000 (JP) ........................................ 2000-092685

(51) Int. Cl.$^7$ ................................................. B60T 8/44
(52) U.S. Cl. .................. 303/114.1; 303/113.4; 303/115.4; 303/113.3
(58) Field of Search .................. 303/3, 155, 113.4, 303/114.1, 114.2, 115.4, 116.1, 113.3

(56) References Cited

U.S. PATENT DOCUMENTS

| | | | | |
|---|---|---|---|---|
| 4,629,258 A | * | 12/1986 | Resch et al. | 303/114.1 |
| 4,919,493 A | * | 4/1990 | Leiber | 303/15 |
| 5,954,406 A | * | 9/1999 | Sawada | 303/122.09 |
| 6,019,438 A | * | 2/2000 | Sawada et al. | 303/113.4 |
| 6,027,184 A | * | 2/2000 | Yonemura et al. | 303/116.1 |
| 6,196,641 B1 | * | 3/2001 | Oka et al. | 303/114.1 |
| 6,290,307 B1 | * | 9/2001 | Poertzgen et al. | 303/115.4 |

FOREIGN PATENT DOCUMENTS

DE 195 42 656 A1 5/1997

\* cited by examiner

*Primary Examiner*—Paul N. Dickson  
*Assistant Examiner*—Devon Kramer  
(74) *Attorney, Agent, or Firm*—Burns, Doane, Swecker & Mathis, LLP

(57) ABSTRACT

The present invention is directed to a hydraulic brake apparatus, which includes wheel brake cylinders, and a master cylinder for advancing a master piston in response to operation of a brake pedal. A power chamber is formed behind the master piston. A reaction piston is disposed, with the front end thereof exposed in the power chamber, so as to transmit a reaction force produced by the pressure in the power chamber to the brake pedal. A power source is provided for pressurizing brake fluid stored in a reservoir to supply power pressure to the power chamber. A solenoid valve is provided for opening and closing a return passage which connects the power chamber to the reservoir, thereby to return the brake fluid thereto. A detection device is provided for detecting the amount of operation of the brake pedal. The solenoid valve is controlled in response to the amount of operation detected by the detection device to reduce the amount of the brake fluid in the power chamber. As a result, even if the brake pedal is operated during the automatic pressurization, with the power pressure supplied by the power source, the brake fluid in the power chamber is reduced by controlling the solenoid valve to be opened and closed, to obtain a sufficient stroke of the brake pedal, so that an adequate brake feeling can be obtained.

8 Claims, 5 Drawing Sheets

HYDRAULIC BRAKE APPARATUS FOR A VEHICLE

This application claims priority under 35 U.S.C. Sec. 119 to No. 2000–92685 filed in Japan on Mar. 30, 2000, the entire content of which is herein incorporated by reference.

BACKGROUND OF THE INVENTION

1. Field of the Invention

The present invention relates to a hydraulic brake apparatus for a vehicle, which is adapted to actuate a master piston by hydraulic braking pressure discharged from a hydraulic pressure source, in response to operation of a brake pedal, or irrespective of operation of the brake pedal.

2. Description of the Related Arts

In German Patent No. DE19542656A1, a hydraulic brake apparatus having a hydraulic pressure source in addition to a master cylinder is disclosed. In the patent, there is disclosed a technology for performing an automatic pressurization by applying hydraulic pressure of a pressure source to a back of a power piston which is integrally connected to a brake pedal. The pressure source includes a hydraulic pressure pump, accumulator or the like. The automatic pressurization is a control for generating the hydraulic braking pressure from the master cylinder so as to perform a traction control, vehicle stability control or the like, when the brake pedal is not operated.

Figure 6:
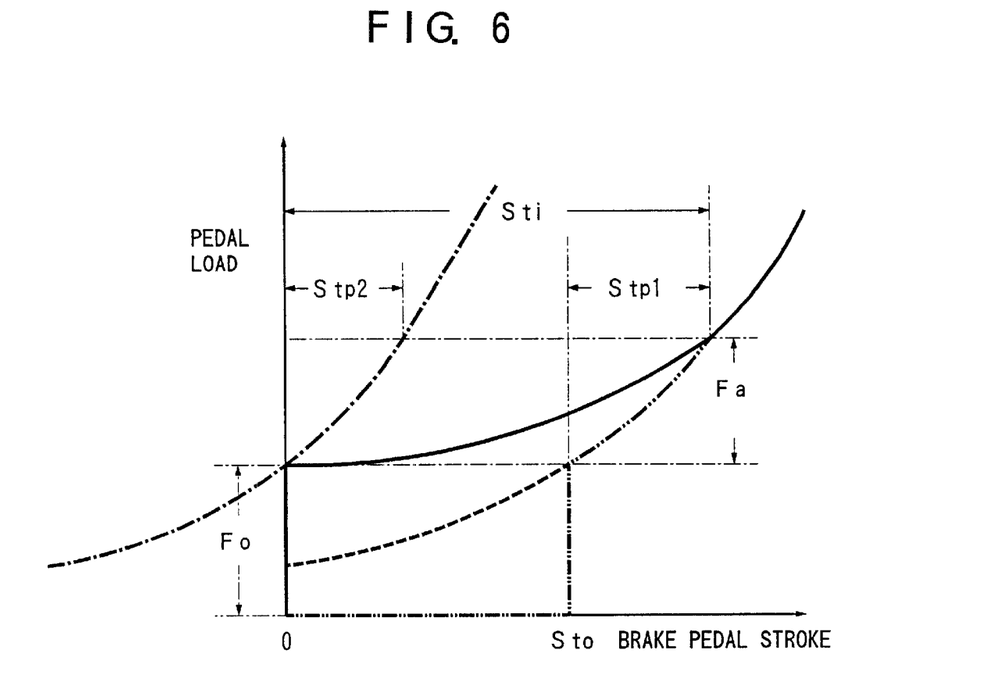
FIG. 6 is a diagram showing characteristics of pedal stroke—pedal load according to an embodiment of the present invention and a prior art.

According to the apparatus as disclosed in the above-described German Patent No. DE19542656A1, when the automatic pressurization is performed, the brake pedal is advanced, without being operated, by a stroke (Sto) of the brake pedal corresponding to the automatically pressurized amount, as indicated by a two-dotted chain line in FIG. 6. Therefore, when the brake pedal is operated in that state, i.e., when the brake pedal is depressed further, while the automatic pressurization is being performed, the brake pedal will be in such a state as to receive a reaction force of load (Of) which corresponds to the hydraulic braking pressure produced by the automatic pressurization with the position of the stroke (Sto) advanced. Thereafter, the pedal load (reaction force) is increased in response to increase of the stroke according to a stroke—pedal load characteristic for a normal operation of the brake pedal. As a result, when the brake pedal is operated further, while the automatic pressurization is being performed, the starting position of the stroke is not placed at the position of the stroke (0), but placed at the position of the stroke (Sto), whereby a stroke stiffness is made so high that it will be difficult to advance the brake pedal.

SUMMARY OF THE INVENTION

Accordingly, it is an object of the present invention to provide a hydraulic brake apparatus having a power chamber formed behind a master piston, and supplied with power pressure by a power source to perform automatic pressurization, wherein a proper brake feeling can be obtained, even if the brake pedal is operated while the automatic pressurization is being performed.

In accomplishing the above and other objects, the hydraulic brake apparatus for a vehicle includes wheel brake cylinders operatively mounted on wheels of the vehicle, respectively, and a master cylinder for advancing a master piston in response to operation of a brake pedal to apply a hydraulic braking pressure to the wheel brake cylinders. A power chamber is formed behind the master piston. A reaction piston is disposed, with the front end thereof exposed in the power chamber, to transmit a reaction force produced by the pressure in the power chamber to the brake pedal. The apparatus further includes a reservoir for storing brake fluid, a power source for pressurizing the brake fluid stored in the reservoir to supply power pressure to the power chamber, a return passage for connecting the power chamber to the reservoir to return the brake fluid thereto, and a valve device for opening and closing the return passage. A detection device is provided for detecting the amount of operation of the brake pedal. And, a controller is provided for controlling the valve device to be opened and closed in response to the amount of operation of the brake pedal detected by the detection device to reduce the amount of the brake fluid in the power chamber. According to the apparatus as described above, therefore, even if the brake pedal is operated during the automatic pressurization, with the power pressure supplied by the power source, the brake fluid in the power chamber is reduced by controlling the valve device to be opened and closed, to obtain a sufficient stroke of the brake pedal, so that an adequate brake feeling can be obtained.

In the apparatus as described above, the controller is preferably adapted to control the valve device to increase the amount of brake fluid returned from the power chamber to the reservoir through the return passage, in response to increase of the amount of operation of the brake pedal detected by the detection device.

The controller may be adapted to control the valve device to control the amount of brake fluid returned from the power chamber to the reservoir through the return passage to be smaller than the amount of brake fluid discharged from the master cylinder in response to operation of the brake pedal.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
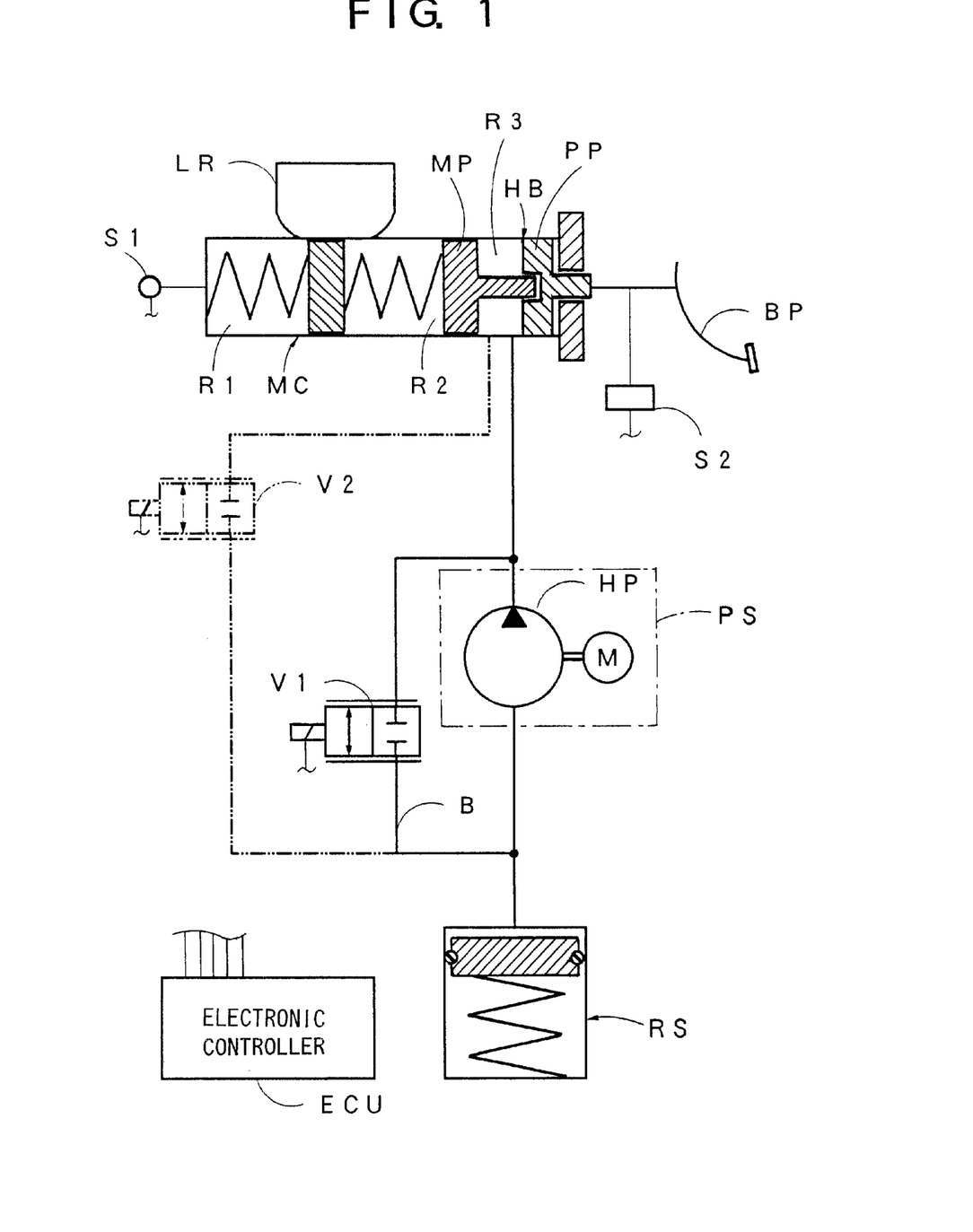
FIG. 1 is a schematic block diagram illustrating a hydraulic brake apparatus according to an embodiment of the present invention.

Referring to FIG. 1, there is schematically illustrated a hydraulic brake apparatus for a vehicle according to an embodiment of the present invention. As shown in FIG. 1, the hydraulic brake apparatus according to the present embodiment includes a conventional master cylinder MC and a hydraulic booster HB, and is so constituted that when a master piston MP is advanced in response to operation of a brake pedal BP, the brake fluid supplied from a low pressure reservoir LRS is compressed to generate hydraulic braking pressure from pressure chambers R1 and R2, respectively. This hydraulic braking pressure, i.e., master cylinder pressure, is supplied to wheel brake cylinders (not shown in FIG. 1) operatively mounted on wheels of the vehicle.

The hydraulic booster HB according to the present embodiment is provided for assisting the master piston MP to be moved in response to operation of the brake pedal BP. In the hydraulic booster HB, a power chamber R3 is formed behind the master piston MP. A reaction piston PP is disposed, with its front end exposed in the power chamber R3, to transmit a reaction force produced by the pressure in the power chamber R3 to the brake pedal BP. The reaction piston PP is disposed so as to be engaged with the master piston MP at the rear end thereof, and connected to the brake pedal BP as shown in FIG. 1. These are so arranged that the master piston MP is movable through the reaction piston PP directly in response to operation of the brake pedal BP, and also the master piston MP can be advanced independently, and that the brake pedal BP can be moved rearward in response to a rearward movement of the reaction piston PP.

A power source PS includes a hydraulic pressure pump HP which has an outlet port connected to the power chamber R3, and which is actuated by an electric motor M. An inlet port of the hydraulic pressure pump HP is connected to the reservoir RS, and its outlet port is connected to the power chamber R3 of the hydraulic booster HB. When the hydraulic braking pressure discharged from the hydraulic pressure pump HP (i.e., power pressure) is supplied into the power chamber R3, the master piston MP is forced to be advanced. The reservoir RS includes a case having a predetermined capacity, and a piston and a spring which are accommodated in the case. An opening portion of the case is connected to the inlet port of the hydraulic pressure pump HP. The reservoir RS is provided separately from the low pressure reservoir LRS in FIG. 1, while they may be formed in a body.

As shown in FIG. 1, the outlet port and inlet port are connected to the hydraulic pressure pump HP through a return passage B, in which a normally closed linear solenoid valve VI, which serves as the valve device according to the present invention. The linear solenoid valve V1 is a proportional control valve for controlling a pressure difference between the pressure at its inlet and the pressure at its outlet to be varied in proportion to electric current fed to the solenoid valve for actuating the same. The linear solenoid valve V1 is controlled by an electronic controller ECU as described later, so as to control the amount of brake fluid supplied through the return passage B at least in response to operation of the brake pedal BP. When the linear solenoid valve V1 is placed in its open position, the brake fluid in the power chamber R3 is returned to the reservoir RS through the valve V1, so that the amount of brake fluid in the power chamber R3 is reduced. At the same time, the brake fluid discharged from the hydraulic pressure pump HP is returned to the reservoir RS and stored therein, so that the hydraulic braking pressure applied to the power chamber R3 is reduced. In addition to the linear solenoid valve V1, as shown by a two-dotted chain line in FIG. 1, a return passage may be provided for connecting the power chamber R3 to the reservoir RS, and in this return passage may be disposed a linear solenoid valve V2, which may serve as the valve device according to the present invention.

In the present embodiment, there are disposed a pressure sensor S1 for detecting the hydraulic braking pressure discharged from the master cylinder MC (i. e. , master cylinder pressure), and a stroke sensor S2 for detecting a stroke of the brake pedal BP, which serve together as the detection device for detecting the amount of operation of the brake pedal BP according to the present invention. When both of the outputs of the sensors S1 and S2 exceed respective predetermined values, it is determined that the brake pedal BP was depressed during the automatic pressurization. The electronic controller ECU of the present embodiment is provided with a microcomputer, which includes a central processing unit or CPU (not shown), ROM (not shown), RAM (not shown), input and output ports (not shown) and the like. The output signals of the sensors as described above are fed to the input port, and then to the CPU via respective amplification circuits (not shown).

According to the hydraulic brake apparatus as constituted above, when the electronic controller ECU determines that a traction control mode is to be initiated, for example, the automatic pressurization control starts, so that the electric motor M is driven to actuate the hydraulic pressure pump HP, by which the power pressure is supplied to the power chamber R3 of the hydraulic booster HB, thereby to actuate the master cylinder MC. Then, the hydraulic pressure control for the traction control mode is performed by a pressure control apparatus (not shown in FIG. 1). Instead, by determining a vehicle state on the basis of the outputs of various sensors (not shown), and then controlling the linear solenoid valve V1 to control the amount of brake fluid supplied through the return passage B according to the determined vehicle state, the automatic pressurization for the traction control, steering control by braking, and the like can be performed.

During the automatic pressurization control as described above, when it is determined on the basis of the outputs detected by the pressure sensor S1 and stroke sensor S2 that the brake pedal BP was operated, the linear solenoid valve V1 (or, the linear solenoid valve V2) is placed in its open position at first, so that the brake fluid in the power chamber R3 starts to be discharged to the reservoir RS. In this case, the linear solenoid valve V1 (or, the linear solenoid valve V2) is controlled to be opened or closed, so that the amount of brake fluid supplied through the return passage B is controlled, so as to gradually reduce the amount of brake fluid in the power chamber R3.

Referring to FIG. 6, for example, when the brake pedal BP is depressed during the automatic pressurization (at the position (0) in FIG. 6), a pedal load is already "Of", while the stroke of the brake pedal BP is zero, as shown by a solid line in FIG. 6. According to the present embodiment, however, the linear solenoid valve V1 (or, the linear solenoid valve V2) is controlled to gradually reduce the amount of brake fluid in the power chamber R3. Therefore, the pedal load (i. e. , reaction force) is gradually increased in response to increase of the stroke of the brake pedal BP, until when the load will be increased by "Fa" in response to the amount of operation of the brake pedal BP applied from the position (0) in FIG. 6 (i. e. , additionally depressed amount). In other words, the amount of brake fluid in the power chamber R3 is gradually decreased such that the master cylinder pressure is gradually increased, in response to increase of the stroke of the brake pedal BP.

According to the prior apparatus as disclosed in the aforementioned German patent No. DE19542656A1, when the brake pedal BP is additionally depressed during the automatic pressurization, the stroke which is obtained, starting from the state where the reaction force of the load (Of) was applied at the position of the stroke (Sto), until the state where the pedal load is increased by "Fa" in response to increase of the stroke, is as short as the stroke of "Stp1". And, when the control for reducing the brake fluid in the power chamber R3 is not performed (as shown by a thick one-dotted chain line in FIG. 6), the stroke which is obtained until the state where the pedal load is increased by "Fa" of the additional depression, is as short as the stroke of "Stp2". In contrast to this prior art, according to the present embodiment, the stroke of the brake pedal BP is gradually increased, starting from the state where the reaction force of the load (0f) was applied at the position of the stroke (0), until the state where the pedal load is increased by "Fa" corresponding to the additionally depressed amount, to provide a sufficient stroke of "St1".

Figure 2:
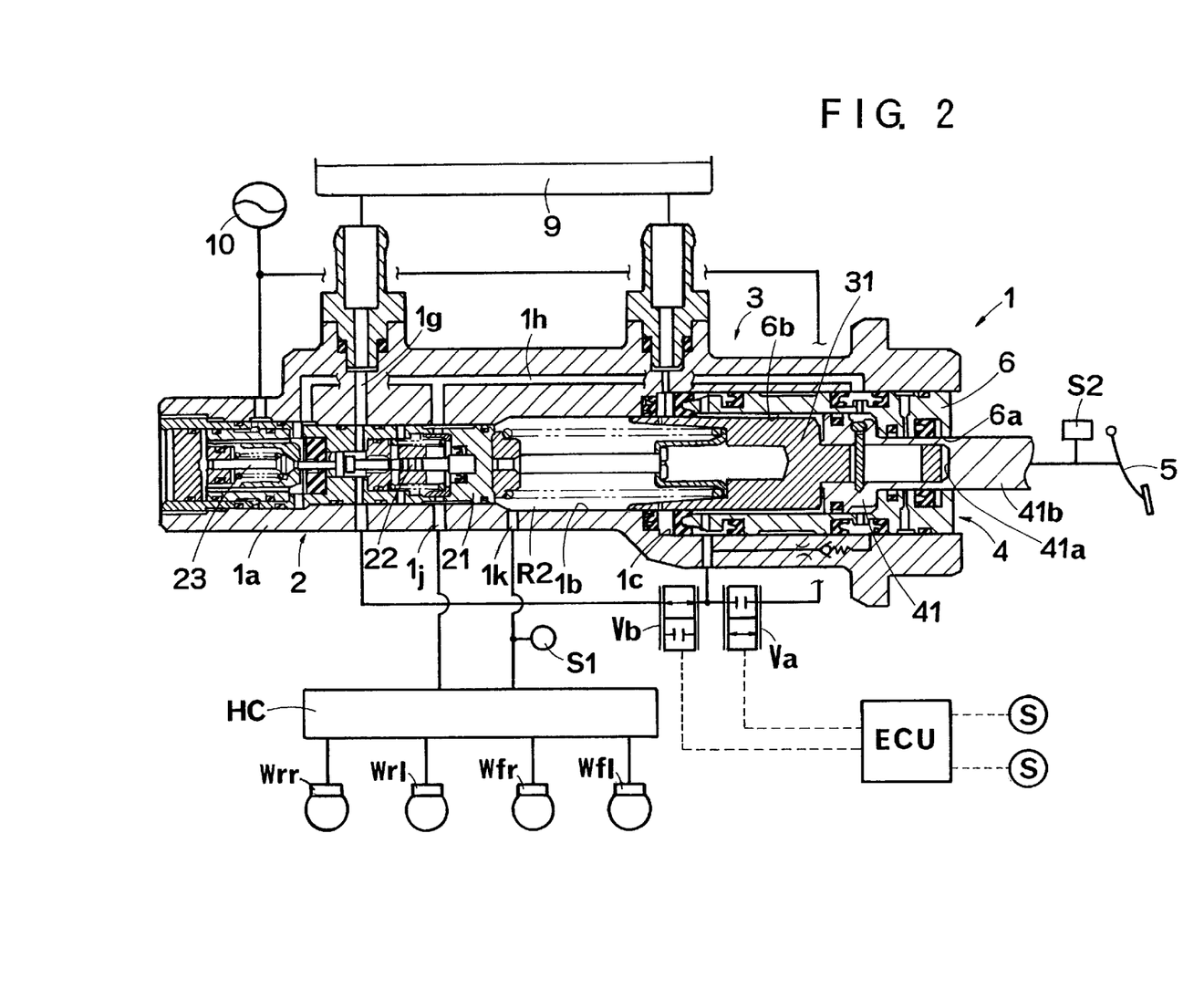
FIG. 2 is a sectional view of a hydraulic brake apparatus according to another embodiment of the present invention.
Figure 3:
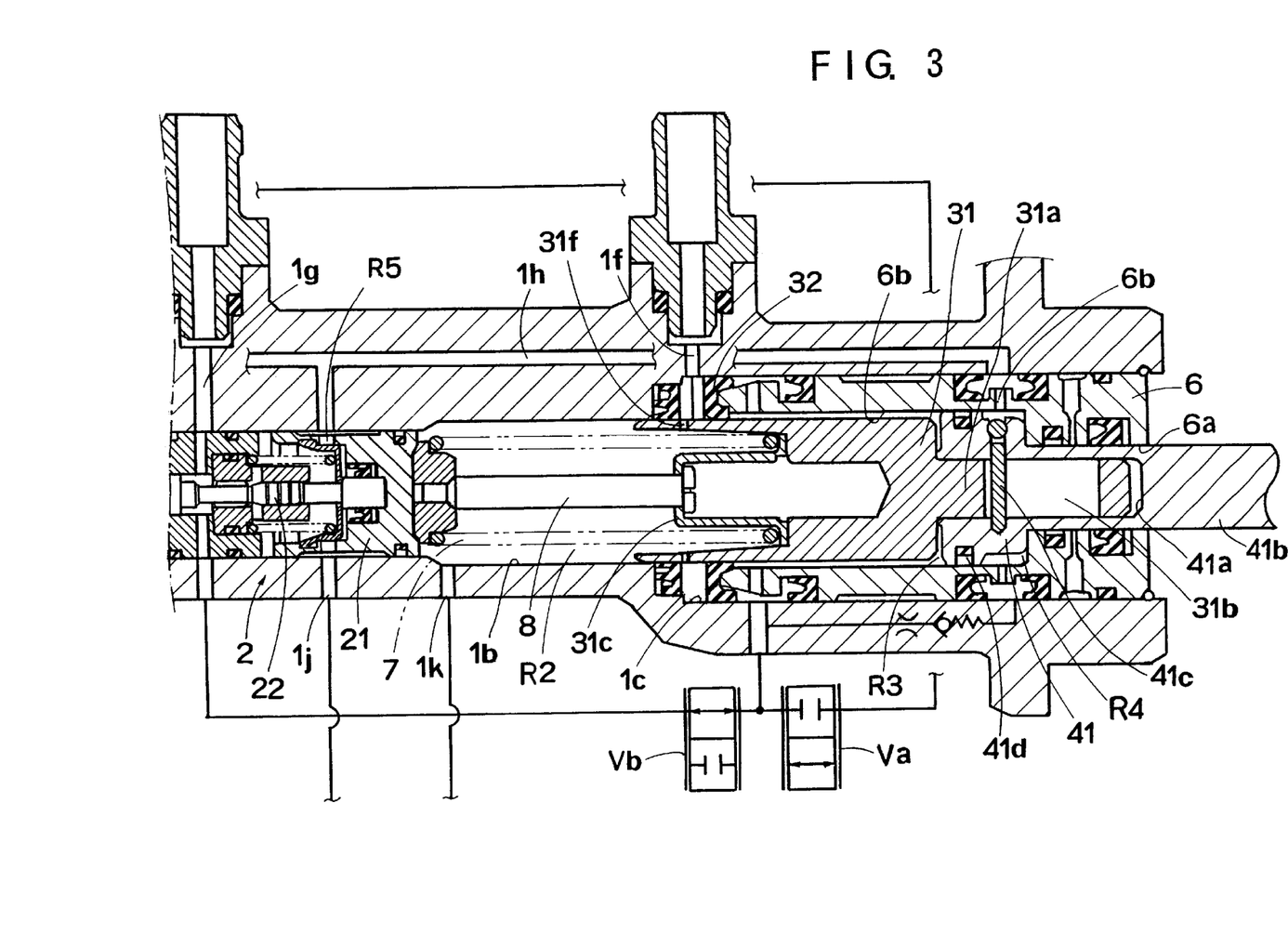
FIG. 3 is an enlarged sectional view of a part of a hydraulic brake apparatus including a master cylinder and a hydraulic booster according to another embodiment of the present invention.

FIGS. 2 and 3 illustrate another embodiment of the hydraulic brake apparatus, wherein a regulator 2 is provided for assisting a master cylinder 3 by regulated pressure output from the regulator 2. A pressure source 10 having a hydraulic pressure pump (not shown) is connected to the regulator 2 and a power chamber R3 formed behind the master cylinder 3 as shown in FIG. 3. The pressure source 10 as shown in FIG. 2 includes the hydraulic pressure pump HP and the electric motor M as shown in FIG. 1, and an accumulator (not shown), if necessary. In this embodiment, a pressure sensor S1 for detecting the master cylinder pressure and a stroke sensor S2 for detecting the stroke of a brake pedal 5 are provided for serving as the detection device for detecting the amount of operation of the brake pedal 5. Furthermore, a brake switch which is turned on when the brake pedal 5 is depressed, and wheel speed sensors, lateral acceleration sensor or the like (these are indicated by "S" in FIG. 2) are connected to the electronic controller ECU. As shown in FIG. 2, in the front portion of a cylinder body 1a of the hydraulic brake apparatus 1 (at the left side in FIG. 2), the regulator 2 is provided, and the master cylinder 3 is provided behind the regulator 2, and further a hydraulic booster 4 is provided behind the master cylinder 3 and connected to the brake pedal 5. In the cylinder body 1a, cylinder bores 1b and 1c are formed, and a plug 6 is fitted into the opening end of the cylinder bore 1c.

FIG. 3 is an enlarged figure of a portion directly related to the present invention in FIG. 2. In the cylinder bore 1b, a control piston 21 of the regulator 2 is received fluid-tightly and slidably. At a stepped portion mating with the cylinder bore 1b within the cylinder bore 1c, a ring-like sealing member 32 is fitted, and the plug 6 is disposed to abut on the member 32, in which the master piston 31 of the master cylinder 3 is received fluid-tightly and slidably. In the plug 6, there is formed a stepped bore having a small diameter cylinder bore 6a and a large diameter cylinder bore 6b. In the stepped bore, a power piston 41, which also acts as a reaction piston according to the present invention, is received fluid-tightly and slidably. A spring 7 is disposed between the master piston 31 and the control piston 21 to expand the distance between them, with the maximum distance limited by a rod 8 engaged with a retainer 31c. According to the present embodiment, therefore, a pressure chamber R2 is formed between the master piston 31 and the control piston 21. The master piston 31 is formed at its front portion with a communication hole 31f, which faces a port 1f when it is placed at its initial position, so that the pressure chamber R2 is communicated with a low pressure reservoir 9 through the port if. Between and portion 41d of the power piston 41 and the sealing member 32, the power chamber R3 is defined. Behind the master piston 31, an axial portion 31a is formed to extend rearward. In front of the power piston 41, there is formed a recess 41a, in which the axial portion 31a of the master piston 31 is slidably received. Thus, the master piston 31 and the power piston 41 are arranged to be movable back and forth relative to each other. The axial portion 31a of the master piston 31 has a slit 31b formed longitudinally. And, a pin 41c is disposed through the slit 31b and fixed to the power piston 41, so that when the pin 41c abuts on the rear side wall of the slit 31b, the forward movement of the master piston 31 relative to the power piston 41 is prevented, thereby to act as a stopper.

The power piston 41 has an axial portion 41b extending rearward therefrom, which is supported fluid tightly and slidably in the cylinder bore 6a of the plug 6, and which extends from the cylinder body 1a rearward, to be connected with the brake pedal 5 (shown in FIG. 2). In the initial state as shown in FIGS. 2 and 3, the front end of the power piston 41 and the rear end of main body of the master piston 31 are in contact with each other. When the rear end of main body of the master piston 31 abuts on the stepped portion between the cylinder bores 6a and 6b, the power piston 41 is prevented from being moved rearward. Thus, the brake pedal 5 and master piston 31 are connected together to be movable relative to each other through the power piston 41, so that when the brake pedal 5 is depressed, the master piston 31 is actuated to be advanced.

Behind the power piston 41, a regulated pressure chamber R4 is formed to act as a power chamber of a conventional hydraulic booster, according to the present embodiment. The regulated pressure chamber R4 is communicated with the regulator 2 through the communication hole 6b of the plug 6 and a pressure passage 1h. Furthermore, a regulated pressure chamber R5 is formed in the regulator 2, and communicated with the wheel brake cylinders Wrr and Wrl as shown in FIG. 2 through an output port 1j and a pressure control apparatus HC. The pressure chamber R2 is communicated with the wheel brake cylinders Wfr and Wfl through an output port 1k and the pressure control apparatus HC. The regulator 2 is not directly related with the present invention, so that the detailed explanation of its structure will be omitted, but its operation will be explained hereinafter. When the control piston 21 is moved, the spool 22 is moved, and also the valve member 23 (FIG. 2) is activated, so that the output pressure (power pressure) of the pressure source 10 is supplied to the regulated pressure chambers R5 and R4 to increase the pressure therein, or the regulated pressure chambers R5 and R4 are communicated with the low pressure reservoir 9 through a port 1g to decrease the pressure in the chambers R5 and R4, thereby to provide a predetermined regulated pressure.

The power chamber R3 is connected to the power source 10 through a normally closed linear solenoid valve Va. When the linear solenoid valve Va is placed in its open position, the power chamber R3 is communicated with the power source 10 to be supplied with the power pressure. Also, the power chamber R3 is connected to a port 1a g through a normally open linear solenoid valve Vb. Normally, the linear solenoid valve Vb is placed in its open position, so that the power chamber R3 is communicated with the low pressure reservoir 9 through the port 1a g. When the linear solenoid valve Vb is placed in its closed position, and the linear solenoid valve Va is placed in its open position, the power pressure will be supplied from the power source 10 to the power chamber R3, so that the master piston 31 will be advanced irrespective of operation of the brake pedal 5 to apply the reaction force to the power piston 41.

According to the hydraulic brake apparatus as constituted above, the linear solenoid valve Va is placed in its closed position, and the linear solenoid valve Vb is placed in its open position, in the initial state as shown in FIGS. 2 and 3, so that the power chamber R3 is communicated with the low pressure reservoir 9. When the brake pedal 5 is depressed in this state, the power piston 41 connected thereto abuts on the master piston 31, so that these are advanced together. Consequently, the pressure chamber R2 is closed and pressurized to advance the control piston 21, whereby the regulated pressure is discharged from the regulator 2. The regulated pressure is supplied to the regulated pressure chambers R4, R5, and supplied to the wheel brake cylinders Wrr and Wrl through the output port 1*j*, to advance the power piston 41 and assist the master piston 31 to be advanced, whereby the master cylinder pressure is supplied to the wheel brake cylinders Wrr and Wrl through the output port 1*k*.

Next, when the traction control, for example, is performed, with the brake pedal 5 held in its inoperative state, the linear solenoid valve Vb is placed in its closed position, and the linear solenoid valve Va is placed in its open position, so that the power pressure is supplied from the power source 10 to the power chamber R3. Consequently, the master piston 31 is advanced to discharge the master cylinder pressure from the output port 1*k*, and the control piston 21 is advanced to discharge the regulated pressure from the regulator 2. In this state for performing the automatic pressurization, if the brake pedal 5 is depressed, and the operation of the brake pedal 5 is detected on the basis of the outputs of the pressure sensor S1 and stroke sensor S2, the linear solenoid valve Va is placed in its closed position, and the linear solenoid valve Vb is controlled to be opened or closed. Consequently, with the stroke of the brake pedal 5 increased, the brake fluid in the power chamber R3 is reduced gradually, to increase the master cylinder pressure and the regulated pressure, gradually.

Figure 4:
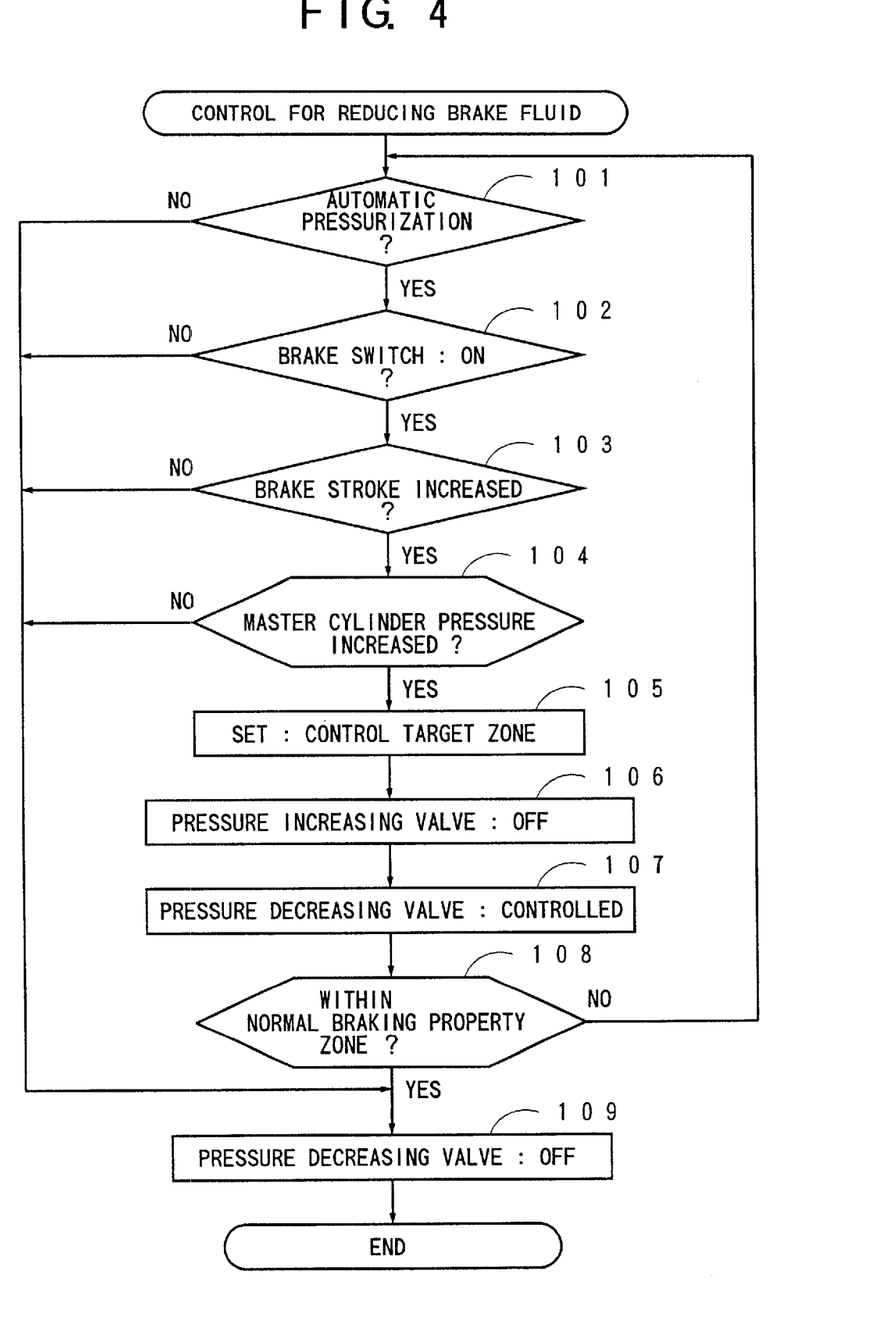
FIG. 4 is a flowchart showing a routine for reducing the amount of brake fluid in a power chamber according to another embodiment of the present invention.

Referring to the flowchart in FIG. 4, the control for reducing the brake fluid in the power chamber R3 will described hereinafter. At the outset, it is determined at Step 101 whether the automatic pressurization is being performed or not. If it is determined that the automatic pressurization is being performed, the program proceeds to Step 102, where it is determined whether the brake pedal 5 is depressed to turn on the brake switch (not shown). If it is determined that the brake switch is turned on, the program further proceeds to Steps 103 and 104, where it is determined whether the stroke of the brake pedal 5 has been increased or not, on the basis of the output of the stroke sensor S2, and determined whether the master cylinder pressure has been increased or not, on the basis of the output of the pressure sensor S. When it is determined that both of the stroke and the pressure have been increased, the program proceeds to Step 105. If the result is negative at any one of the Steps 101–104, the program returns to a main routine (not shown), without performing the control for reducing the brake fluid.

Figure 5:
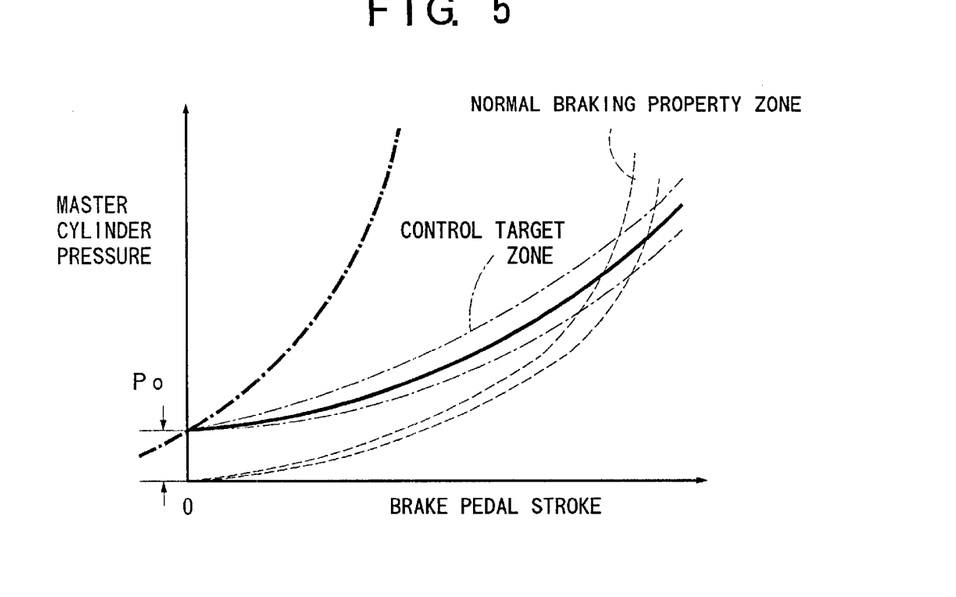
FIG. 5 is a diagram showing a characteristic of pedal stroke—master cylinder pressure according to the present invention.

At Step 105, a control target zone is set, as defined by a pair of thin one-dotted chain lines in FIG. 5. According to a conventional apparatus, when the brake pedal 5 is depressed during the automatic pressurization, the master cylinder pressure has been increased to a certain pressure (Po), at the position where the stroke is zero (0), as shown in FIG. 5. Therefore, the stroke of the brake pedal 5 for increasing the master cylinder pressure from the pressure (Po) up to the pressure added thereto by an additionally depressed stroke is relatively small, to provide a property of the master cylinder pressure increased rapidly in response to increase of the stroke as indicated by a thick one-dotted chain line, normally. In other words, the stiffness of the brake pedal 5 is so high that the brake pedal 5 is hardly depressed.

In contrast to the conventional property, according to the present embodiment, the area enclosed by the thin one-dotted chain lines is set for the control target zone, in order that the master cylinder pressure is controlled to trace a solid line from the state applied with the reaction force of the load corresponding to the master cylinder pressure (Po) at the position of the stroke (0). That is, the control target zone is set such that the master cylinder pressure after the brake pedal was operated is controlled to exceed always the pressure (Po), and controlled to be gradually increased, with the stroke of the brake pedal 5 increased. The area enclosed by a pair of thin broken lines is a zone having a predetermined range provided for the property of the master cylinder pressure to the stroke of the brake pedal in a normal braking operation (hereinafter, referred to as a normal braking property zone).

Accordingly, a pressure increasing solenoid valve, i. e. , the linear solenoid valve Va is placed in its closed position at Step 106, and a pressure decreasing solenoid valve, i. e., the linear solenoid valve Vb is controlled to be opened and closed at Step 107. That is, the linear solenoid valve Vb is controlled to be opened and closed, in order that the brake pedal stroke and the master cylinder pressure are fallen within the control target zone as shown in FIG. 5. The Steps 101–107 are repeated, until it is determined at Step 108 that they are fallen within the normal braking property zone. When it is determined at Step 108 that they are fallen within the normal braking property zone, the program further proceeds to Step 109, where the linear solenoid valve Vb which acts as the pressure decreasing solenoid valve is turned off to be placed in its open position, so that the control for decreasing the brake fluid is terminated. As indicated by the solid line in FIG. 6, therefore, according to the present embodiment, the stroke of the brake pedal 5 is gradually increased, starting from the state where the reaction force of the load (Of) was applied at the position of the stroke (0), until the state where the load is increased by "Fa" corresponding to the additionally depressed amount, to provide a sufficient stroke of "Sti" for the stroke of the brake pedal 5.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A hydraulic brake apparatus for a vehicle comprising:
   wheel brake cylinders operatively mounted on wheels of said vehicle, respectively;
   a master cylinder for advancing a master piston in response to operation of a brake pedal to supply hydraulic braking pressure to said wheel brake cylinders;
   a power chamber formed behind said master piston;
   a reaction piston with the front end thereof exposed in said power chamber for transmitting a reaction force produced by the pressure in said power chamber to said brake pedal;
   a reservoir for storing brake fluid;
   a power source for pressurizing the brake fluid stored in said reservoir to supply power pressure to said power chamber;
   a return passage for connecting said power chamber to said reservoir to return the brake fluid thereto;
   valve means for opening and closing said return passage;

detection means for detecting the amount of operation of said brake pedal; and control means for controlling said valve means to be opened and closed in response to the amount of operation of said brake pedal detected by said detection means to reduce the amount of the brake fluid in said power chamber.

2. A hydraulic brake apparatus as set forth in claim 1, wherein said control means controls said valve means to increase the amount of brake fluid returned from said power chamber to said reservoir through said return passage, in response to increase of the amount of operation of said brake pedal detected by said detection means.

3. A hydraulic brake apparatus as set forth in claim 2, wherein said control means controls said valve means to control the amount of brake fluid returned from said power chamber to said reservoir through said return passage to be smaller than the amount of brake fluid discharged from said master cylinder in response to operation of said brake pedal.

4. A hydraulic brake apparatus as set forth in claim 2, wherein said valve means includes a linear solenoid valve for opening and closing said return passage, and wherein said control means controls said linear solenoid valve to be opened or closed in response to the amount of operation of said brake pedal detected by said detection means.

5. A hydraulic brake apparatus as set forth in claim 1, further comprising:

a regulator for regulating the power pressure discharged from said power source to produce a regulated pressure;

a regulated pressure chamber formed behind said reaction piston, and connected to said regulator for receiving the regulated pressure discharged therefrom; and a normally closed solenoid valve disposed between said power chamber and said power source, wherein said valve means includes a normally open solenoid valve disposed between said power chamber and said reservoir, and wherein said control means controls said normally closed solenoid valve to be opened when said brake pedal is operated, and said control means controls said normally open solenoid valve to be opened and closed in response to the amount of operation of said brake pedal detected by said detection means to reduce the amount of the brake fluid in said power chamber.

6. A hydraulic brake apparatus as set forth in claim 5, wherein said control means controls said normally open solenoid valve to be opened and closed, to increase the amount of brake fluid returned from said power chamber to said reservoir through said return passage, in response to increase of the amount of operation of said brake pedal detected by said detection means.

7. A hydraulic brake apparatus as set forth in claim 1, wherein said power source includes a hydraulic pressure pump for pressurizing the brake fluid stored in said reservoir to discharge the power pressure, and an electric motor for actuating said pump.

8. A hydraulic brake apparatus as set forth in claim 1, wherein said detection means includes a sensor for detecting the hydraulic braking pressure output from said master cylinder, and a sensor for detecting a stroke of said brake pedal, and wherein said detection means detects the amount of operation of said brake pedal in response to at least one of the outputs from said sensors.

* * * * *